United States Patent [19]
Grau et al.

[11] Patent Number: 5,910,803
[45] Date of Patent: *Jun. 8, 1999

[54] NETWORK ATLAS MAPPING TOOL

[75] Inventors: Stephen H. Grau, Pleasanton; Stephen Bostock, Morgan Hill, both of Calif.

[73] Assignee: Novell, Inc., Orem, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 08/696,681

[22] Filed: Aug. 14, 1996

[51] Int. Cl.$^6$ .............................. G06F 3/14; G06F 11/30
[52] U.S. Cl. ......................... 345/357; 345/969; 345/349; 395/200.54
[58] Field of Search .................................... 345/357, 356, 345/349, 353, 969, 966, 340, 346, 335, 440, 967, 964; 707/501, 513, 514, 502; 395/200.54, 200.53

[56] References Cited

U.S. PATENT DOCUMENTS

| | | | |
|---|---|---|---|
| 4,833,592 | 5/1989 | Yamanaka | 364/188 X |
| 5,226,120 | 7/1993 | Brown et al. | 395/200.54 |
| 5,247,517 | 9/1993 | Ross et al. | 370/85.5 |
| 5,276,789 | 1/1994 | Besaw et al. | 345/440 |
| 5,295,244 | 3/1994 | Dev et al. | 345/357 |
| 5,394,552 | 2/1995 | Sanchez-Frank et al. | 345/349 |
| 5,412,772 | 5/1995 | Monson | 345/335 |
| 5,504,863 | 4/1996 | Yoshida | 345/356 X |
| 5,572,640 | 11/1996 | Schettler | 345/440 |
| 5,684,967 | 11/1997 | McKenna et al. | 395/200.53 X |
| 5,715,432 | 2/1998 | Xu et al. | 345/356 X |
| 5,751,965 | 5/1998 | Mayo et al. | 395/200.54 |
| 5,793,974 | 8/1998 | Messinger | 395/200.54 |
| B1 4,555,775 | 12/1995 | Pike | 345/340 X |

OTHER PUBLICATIONS

Smith, Catherine J.; Kulakow, Arthur J.; Gannon, Kathleen L.; "HP Open View Windows: A User Interface for Network Management Solutions," Hewlett–Packard Journal, Apr. 1990, pp. 60–65.

AT&T News Release dated Nov. 13, 1991; "Tridom Offers Powerful New Network Management Tools".

"Management system designed for Synoptics Ethernet. (product announcement)," 1988 Fairchild Publications Inc.

"Physical layer network management: the missing link (local area networks)," 1989 Horizon House Publications Inc.

"Open View has more features than the other two products. (Open View Network Node Manager 3.1, network management software from Hewlett–Packard Co.) (Software Review) (one of three evaluations of SNMP–based remote management products in 'Compatibility in Three Consoles') (Simple Network Management Protocol) (Evaluation)," 1992 Ziff–Davis Publishing Company.

"IBM's NetView/6000 challenges the best. (Network Edition: First Looks) (Software Review) (network management software) (Evaluation)," 1993 Ziff–Davis Publishing Company.

"NetView/6000 slingshots ahead. (IBM's network management software ahead of HP's HP Open View; IBM licenses technology to DEC, plans to jointly develop new applications)," 1993 Cardinal Business Media Inc.

(List continued on next page.)

Primary Examiner—Raymond J. Bayerl
Attorney, Agent, or Firm—Cesari & McKenna, LLP

[57] ABSTRACT

A network mapping tool efficiently organizes and displays topology data of an internetwork computing system as a hierarchical collection of network maps, i.e., a network atlas. The tool includes a management server that collects, organizes and records the topology data as an atlas on a network topology database. A management console interacts with the server to provide a graphical user interface for displaying the atlas on a computer screen in a variety of views that facilitate comprehension of logical relationships between various components of the system.

11 Claims, 11 Drawing Sheets

OTHER PUBLICATIONS

"LAN/WAN mgmnt: Ungermann–Bass intros multitasking network management system; users commit to new platform. (new multitasking, microcomputer–based NetDirector handles physical management through implementation of client/server architectuer on LAN Manager–based local and wide area networks; beta customers satisfied with and migrate to new physical network management platform) (product announcement)," 1990 Edge Publishing.

"Ungermann–Bass OS/2 suite to oversee disparate LANs. (Ungermann–Bass Inc. introduces NetDirector OS/2 package for managing multivendor local area networks) (product announcement)," 1990 Ziff–Davis Publishing Company.

"Ungermann–Bass joins the personal computer–based network management fray. (NetDirector network management software) (product announcement)," 1990 Apt Data Services (UK).

"Accumaster Integrator Release 3.0 expands SNA capabilities," ATT News Release dated Jun. 17, 1992.

Muller, Nathan J., "Intelligent Hubs," 1993 Artech House, Inc., pp. 73–290.

HP Network Node Manager, http://www.dmo.hp.com/nsmd/ov/nnm.html, Network Node Manager, The Industry's Best Network Management Solution for Multivendor TCP/IP Environments Nov. 20, 1995, 2 pages, Hewlett Packard.

NetView/6000 and NetView for AIX, http://www.raleigh.ibm.com/nv6/nv6over.html, Managing A World of Difference, 1995 IBM Corporation, 3 pages, Nov. 20, 1995.

Catalog: Spectrum 3.0, http://www.ctron.com/Catalog/Net–Management/Spectrum.html, Spectrum 3.0, Detailed Graphical Views of your Network, 4 pages, Nov. 20, 1995, Product Catalog.

ManageWise 2.0, The smart way to manage your network, Novell, Intel Network Technology From Intel, 4 pages.

NETWORK ATLAS MAPPING TOOL

CROSS-REFERENCE TO RELATED APPLICATION

This invention is related to copending and commonly assigned U.S. patent application Ser. No. 08/698,057, titled METHOD AND APPARATUS FOR ORGANIZING OBJECTS OF A NETWORK MAP, which application was filed on even date herewith.

FIELD OF THE INVENTION

This invention relates generally to internetwork computing systems and, more specifically, to an improved network mapping tool for efficiently managing complex internetwork computing systems.

BACKGROUND OF THE INVENTION

An internetwork computing system is a geographically distributed collection of interconnected network segments for transporting data between computing nodes, such as routers. The network segments are typically local area networks (LANs) coupled together by point-to-point wide area networks (WANs). A LAN is a limited area network that typically consists of a transmission medium, such as coaxial cable or twisted pair, for connecting the nodes, while a WAN may be a public or private telecommunications facility that interconnects widely dispersed LANs. Collectively, the LAN and WAN segments may be configured to form a complex topology of internetworked computing nodes that interact according to a predefined set of rules or protocols.

A network mapping system is used to manage such complex internetwork computing systems by providing network management service tools. These services may be implemented in accordance with a client/server architecture, wherein the clients, e.g., personal computers or workstations, are responsible for interacting with the users and the servers are computers configured to perform the services as directed by the clients. Furthermore, the service tools may range from map-drawing software to capabilities for automatically discovering the topology of network segments using a variety of LAN, WAN and protocol technologies. Information pertaining to the discovered topology is typically gathered to build a coherent database model of the internetwork system.

However, the tools used for viewing the topology of the network are typically difficult to comprehend primarily because the entire internetwork is often presented as a single, monolithic "page" on a computer display. As a result, the layout of the internetwork is such that nodes typically appear far away from their neighboring nodes, making it hard to discern relationships among elements of the system. Furthermore, the internetwork layout typically changes as new nodes are discovered.

SUMMARY OF THE INVENTION

The present invention relates to a network mapping tool for efficiently organizing and displaying topology data of an internetwork computing system as a hierarchical collection of network maps, i.e., a network atlas. In accordance with the invention, the mapping tool includes a management server that collects, organizes and records the topology data as the atlas on a network topology database. A management console interacts with the server to provide a graphical user interface for displaying the atlas on a computer screen in a variety of views that facilitate comprehension of logical relationships between various components of the system.

Specifically, the management server comprises an atlas manager that coordinates access to the atlas database for editing and viewing the atlas maps. The atlas manager, in turn, comprises an atlas creator that creates the atlas from the topology data and a layout manager for executing layout operations that enable display of the created atlas maps in a manner that is visually appealing to a user and easier to comprehend.

On the other hand, the management console preferably comprises an atlas viewer for displaying selected maps of the atlas that are visible through specialized windows of the graphical user interface. To that end, the atlas viewer cooperates with the atlas manager to retrieve the topology data describing the structure and layout of the selected maps within the network atlas. Maps are preferably selected using a browser navigation facility which allows a user to easily switch between maps of interest by selecting the name of a desired map.

For example, as the user "browses" the atlas, the viewer module fetches the appropriate data from the network topology database needed to execute navigation and display functions. These functions are preferably implemented in response to user commands provided from an input device, such as a mouse. As a result of these commands, the atlas viewer navigates, i.e., switches, from a currently displayed map and scrolls to an area of interest.

Similarly, the atlas viewer responds to user commands from the input device to configure the atlas in a customized arrangement specified by the user; alternatively, the atlas manager may create a default configuration of the atlas. As noted, the atlas viewer interacts with the atlas manager to record any customized changes to the default arrangement in the atlas database.

In the illustrative embodiment, the network mapping tool is preferably embodied as a customized framework having generic base classes for defining novel window and network atlas objects. The network atlas objects generally represent a connected graph of linked nodes within the hierarchical atlas of maps manifested on specialized "viewer" windows defined by the window objects. In particular, the nodes of the maps are router and segment objects, while the "links" are preferably interfaces between those objects.

Each map of the atlas depicts a portion or page of the internetwork system, with a top-level page illustrating the overall WAN structure of the system and subordinate-level pages showing the structures of specific campuses, i.e., LAN-connected areas of the system. Notably, each map may refer to other maps of the atlas by way of map cross-reference objects. The router, segment and map reference objects are preferably displayed as icons at various locations on a map, with the links shown as lines coupling the icons.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF ILLUSTRATIVE EMBODIMENT

Figure 1:
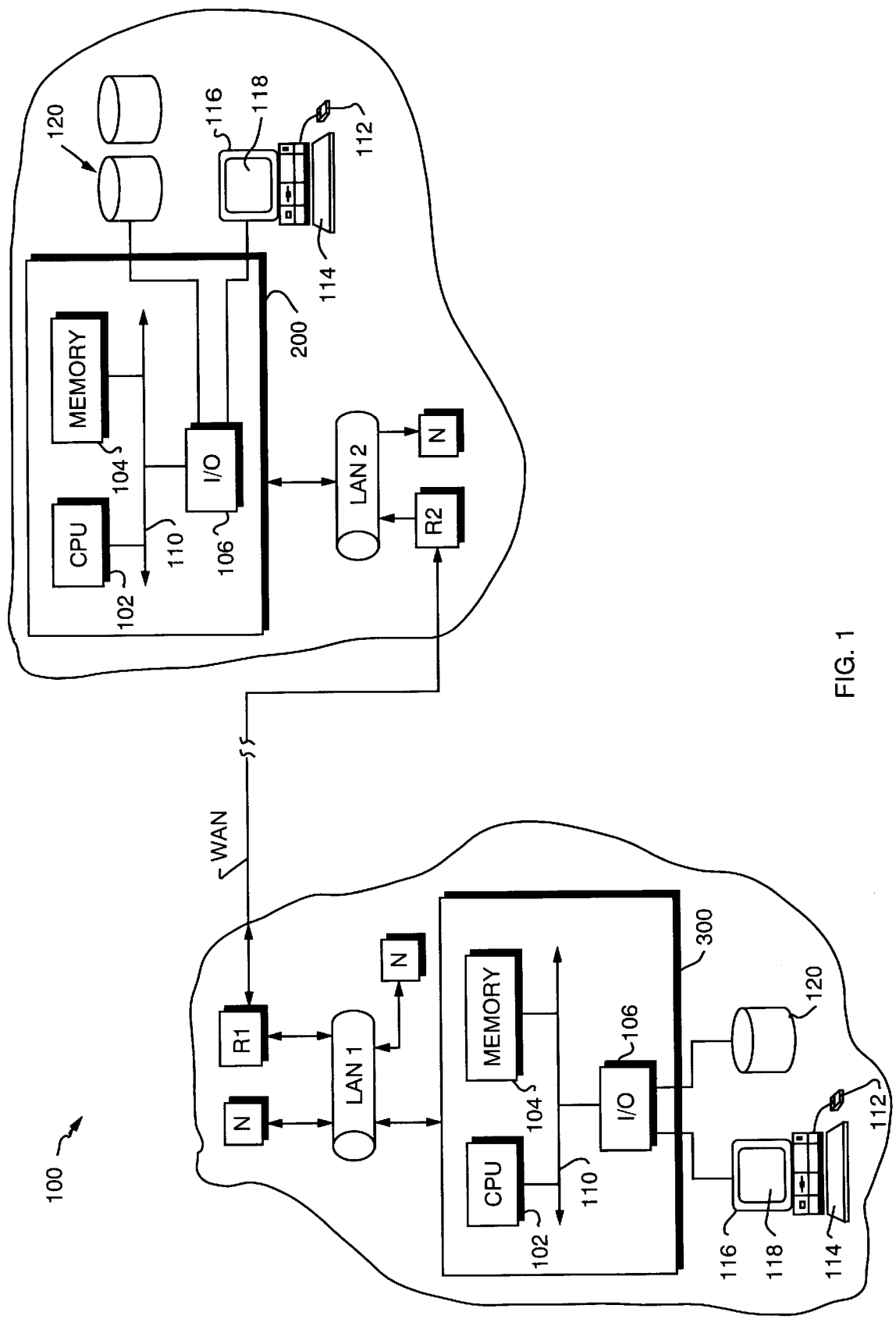
FIG. 1 is a block diagram of an internetwork computing system including a collection of network segments connected to a plurality of stations.

FIG. 1 is a block diagram of an internetwork computing system 100 comprising a collection of network segments connected to a plurality of stations. The nodes are typically general-purpose computers comprising a management server station 200, a management console station 300, a plurality of end stations N and a plurality of intermediate stations R1–R2. Each station typically comprises a central processing unit (CPU) 102, a memory unit 104 and an input/output (I/O) unit 106 interconnected by a system bus 110. The memory unit 104 may comprise storage locations typically composed of random access memory (RAM) devices, which are addressable by the CPU 102 and I/O unit 106. An operating system, portions of which are typically resident in memory and executed by CPU, functionally organizes the station by, inter alia, invoking network operations in support of application programs executing in the CPU.

The I/O unit 106, in turn, connects the station to the network segments, a conventional display monitor 116 and a mass storage device, such as disk 120. The display monitor 116 includes a display screen 118 and cursor control devices, such as a mouse 112 and keyboard 114. In the case of the management server 200, the disk may function as a network topology database 120 for storing topology data relating to the system 100, as described further herein. Typically, the I/O unit 106 receives information, such as control and data signals, from the mouse or keyboard and provides that information to the CPU 102 for transfer over the network segments, for storage on the database or for display on the screen 118.

The network segments included within system 100 are preferably local area networks (LANs) 1–2 coupled to a wide area network (WAN) by intermediate stations R1–R2. The intermediate stations R1–R2 may be routers configured to facilitate the flow of data throughout the system 100 by routing that data to the proper receiving stations. Collectively, the LAN and WAN segments may be configured to form a complex topology of internetworked computing stations that interact according to predefined set of protocols.

As noted, a network mapping system is typically used to manage such a complex internetwork computing system by providing network management services. According to the invention, a novel network mapping tool is provided for implementing these services in accordance with a client/server architecture, wherein the client is the management console node 300 that is responsible for interacting with a user and the management server node 200 functions as the server to perform services as directed by the client. As described herein, this tool organizes and displays topology data as a hierarchical collection of network maps, i.e., a network atlas. Each map of the atlas shows a portion of the computing system as a connected graph of nodes; these nodes generally comprise the router and network segments.

Figure 2:
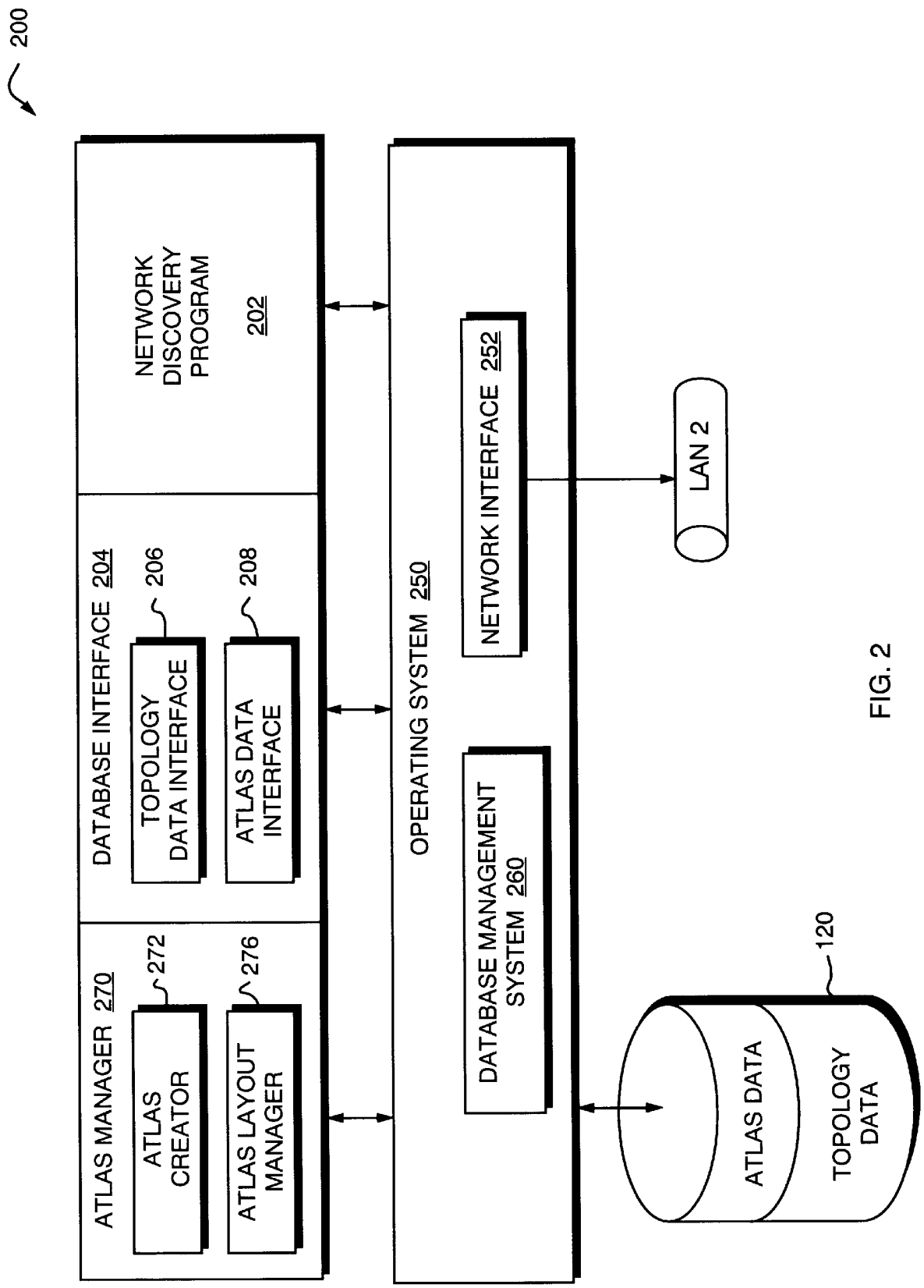
FIG. 2 is a highly schematized diagram of the software components of a management server station coupled to the internetwork computing system of FIG. 1.

FIG. 2 is a highly schematized diagram of the software components of the management server station 200. The management server 200 generally monitors the internetwork in order to collect, organize and record topology data and atlas data in the topology database 120. To that end, the server includes a database interface component 204 having a topology data interface 206 and an atlas data interface 208 for accessing the data in the database. In addition, a conventional network discovery component 202 is provided for automatically discovering the topology of network segments using a variety of LAN, WAN and protocol technologies.

The server further includes operating system software 250 having a collection of utility programs for controlling the operation of the station 200. These utility programs generally include a network interface 252 that provides the server access to the network system 100 and a database management system 260 that communicates with the interfaces 206 and 208 when exchanging data with the database 120.

In accordance with an aspect of the invention, the management server 200 also comprises an atlas manager 270 that coordinates access to the database 120 for editing and viewing the atlas maps. The atlas manager, in turn, comprises an atlas creator 272 that creates the atlas from the topology data and a layout manager 276 for executing layout operations that enable display of the created atlas maps in a manner that is visually appealing to a user. An example of these layout operations is provided in copending and commonly assigned U.S. patent application Ser. No. 08/698,057 titled Method and Apparatus for Organizing Objects of a Network Map, filed on even date herewith, which application is incorporated by reference as though fully set forth herein.

Figure 3:
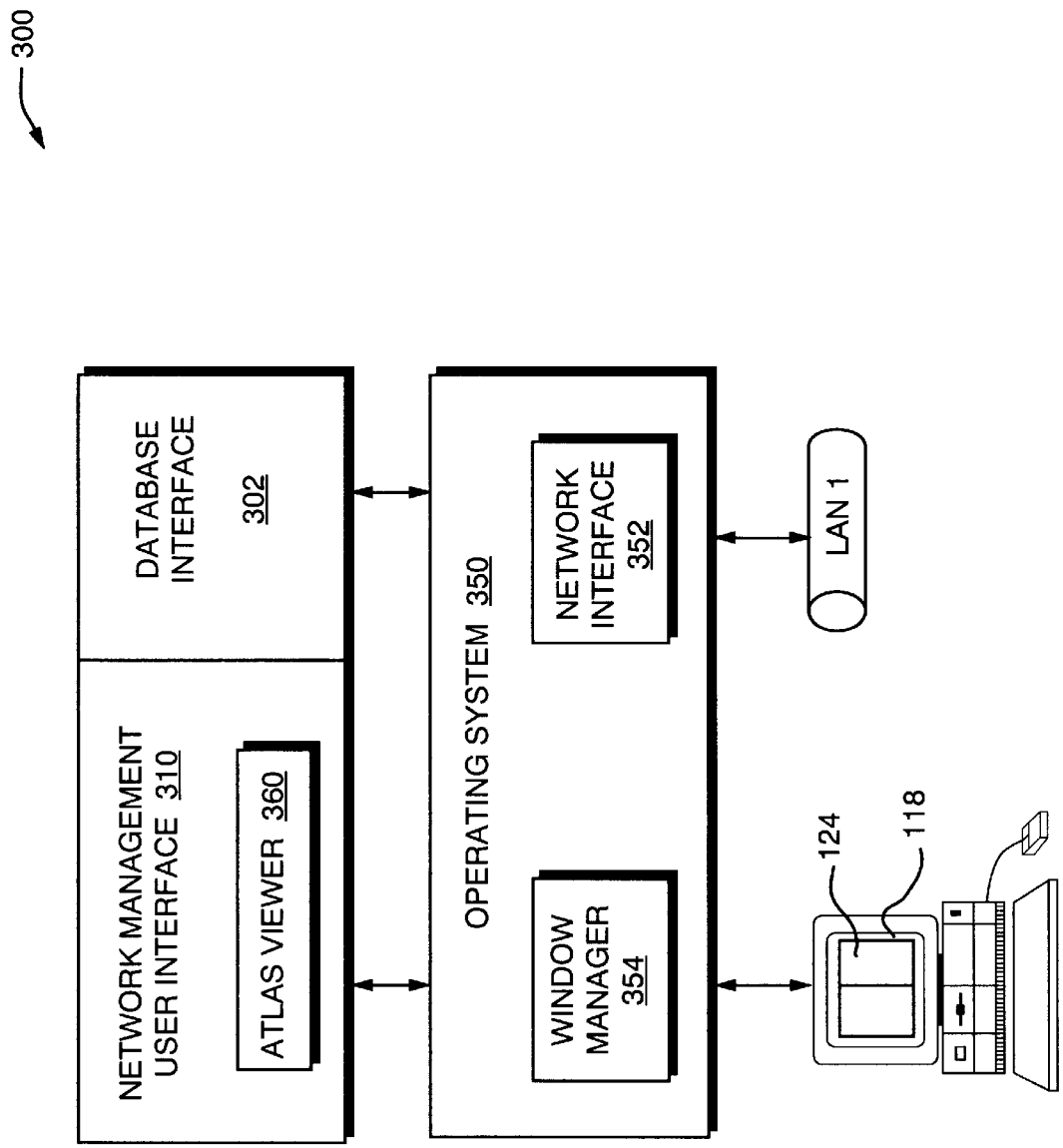
FIG. 3 is a highly schematized diagram of the software components of a management console station coupled to the internetwork computing system of FIG. 1.

FIG. 3 is a highly schematized diagram of the software components of the management console station 300. These components generally include an operating system 350 which interacts with various application program components to provide high-level functionality, including a direct interface with the user. The application program components include a database interface component 302 configured to interact with the management server 200 when manipulating data and controlling the operations of that server. In addition, a network management user interface component 310 allows the user to view aspects of the internetwork system (e.g., configuration, state and history) and perform management-type operations on the internetwork.

Utility programs such as a network interface 352 are included in the operating system software to provide the console with access to the network system 100 and a window manager 354. The window manager is a system software routine that is generally responsible for managing windows that the user views during operation of an application program. That is, it is generally the task of the window manager to keep track of the locations and sizes of the windows and window areas which must be drawn and redrawn in connection with such application execution.

Broadly stated, the application programs make use of the functions of the utility programs by issuing a series of task commands to the operating system which then performs the requested task. For example, the database interface component 302 may request that the network interface 352 initiate transfer of information over LAN 1; likewise, the network management user interface 310 may request that the window manger 354 display certain information on a window of the screen 118 for presentation to the user.

Further to this latter example, the console 300 also comprises an atlas viewer application component 360 which, in connection with the window manager 354, provides a graphical user interface for displaying the topology data as an atlas on specialized viewer windows 124 of the display screen 118. Specifically, the atlas viewer and window manager operate to display views of selected maps of the atlas on the viewer windows 124 to facilitate comprehension of logical relationships between various components of the system 100. The atlas viewer 360 also cooperates with the atlas manager 270 to retrieve the topology data describing the structure and layout of the selected maps within the network atlas. More specifically, as the user "browses" the atlas, the viewer module fetches the appropriate data from the network topology database needed to execute the navigation and display functions.

Each station of the system 100 may be a general-purpose computer, such as a personal computer of the IBM® series of computers sold by International Business Machines Corp., although the invention may also be practiced in the context of other types of computers. These computers have resident thereon, and are controlled and coordinated by, operating system software, such as the IBM OS/2® operating system or the Microsoft® Windows® operating system. In addition, a window environment, such as the Windows® graphical user interface, is preferably displayed on the screen 118 as a graphical display to facilitate interactions between the user and the station. The graphical display is typically arranged to resemble a desktop and, as described herein, the application programs execute in the novel viewer windows 124 of the screen 118.

The invention herein features, along with these specialized windows, the provision of the new network mapping tool which, when invoked, cause actions to take place that enhance the ability of a user to interact with the computing system. As noted, the novel mapping tool efficiently organizes and displays the topology data of the system as novel atlas elements. This new behavior of the system is brought about by the interaction of the mapping tool with a series of system software routines associated with the operating system. These system routines, in turn, interact with the application program components to create the viewer windows, and atlas elements, as described herein.

Figure 4:
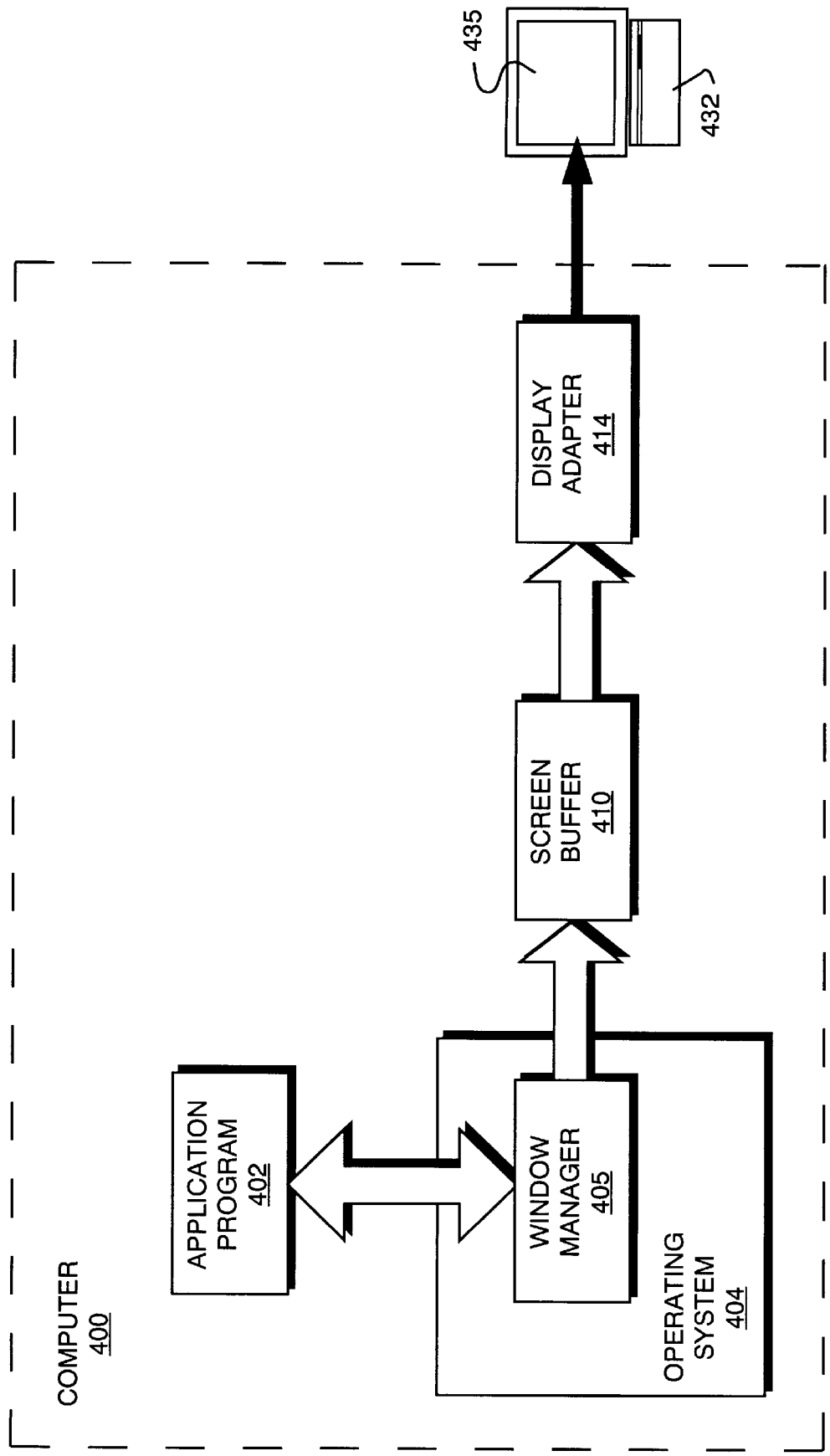
FIG. 4 is a schematic diagram illustrating the interaction of an application program and an operating system of a computer 400, which is similar to the management console station of FIG. 1.

FIG. 4 is a schematic illustration of the interaction of an application program 402 and an operating system 404 of a computer 400, which is similar to, and has equivalent elements of, the console station 300. The application program 402 and the operating system 404 interact to control and coordinate the operations of the computer 400. In order to display information on a screen display 435, application program 402 generates and sends display commands to a window manager 405 of the operating system 404. The window manager program 405 stores information directly into a screen buffer 410. Under control of various hardware and software in the system, the contents of the screen buffer 410 are read out of the buffer and provided to a display adapter 414. The display adapter contains hardware and software (sometimes in the form of firmware) which converts the information in the screen buffer 410 to a form which can be used to drive a display screen 435 of a monitor 432.

In a preferred embodiment, the invention described herein is implemented in a C++ programming language, such as Microsoft Visual C++, using object-oriented programming (OOP) techniques. The C++ language is well-known and many articles and texts are available which describe the language in detail. In addition, C compilers are commercially available from several vendors. Accordingly, for reasons of clarity, the details of the C++ language and the operation of its compiler will not be further discussed.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item.

Objects are defined by creating "classes" which are not objects themselves, but which act as templates that instruct the compiler how to construct an actual object. A class may, for example, specify the number and type of data variables and the steps involved in the functions which manipulate the data. Objects are created and destroyed at run-time according to functions defined by the classes; the functions are compiled into executable statements by the compiler. Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, their internal data structure and internal functions. Polymorphism is a concept which allows objects and functions that have the same overall format, but that work with different data, to function differently in order to produce consistent results. Inheritance, on the other hand, allows program developers to easily reuse pre-existing programs and to avoid creating software from scratch.

Figure 5:
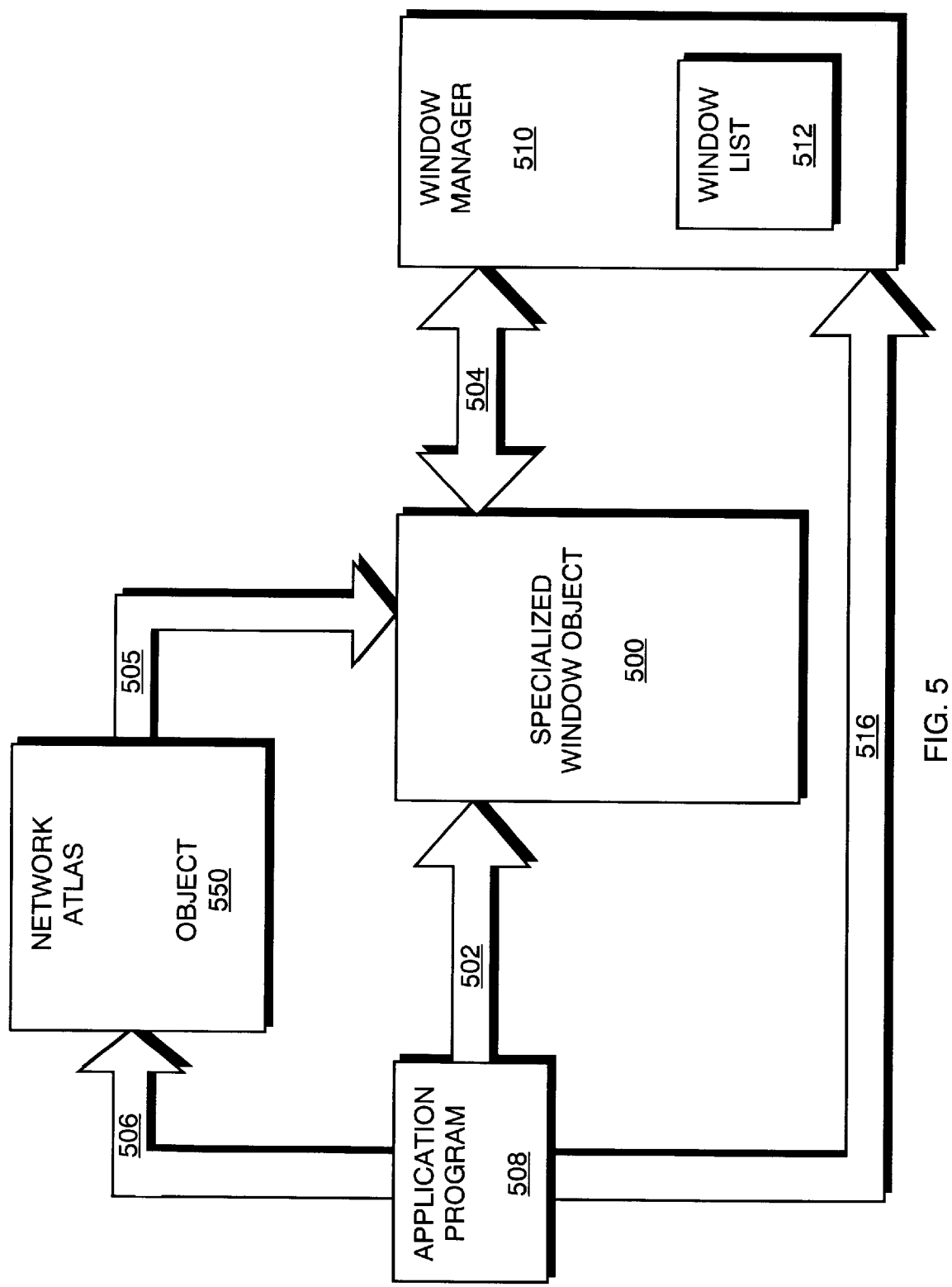
FIG. 5 shows the interaction between an application program and a window manager to create and manipulate novel network atlas objects in accordance with the invention.

In accordance with the present invention, the windows and novel atlas elements are "objects" created by the application program to communicate with the window manager. Interaction between an application program and a window manager is illustrated in greater detail in FIG. 5. In general, an application program 508 interfaces with the window manager 510 by creating and manipulating objects. The window manager itself may be an object which is created when the operating system is started. Specifically, the application program creates specialized window objects 500, as depicted by arrow 502, that cause the window manager to create associated viewer windows on the display screen. In addition, the application program 508 creates individual network atlas objects 550, indicated by arrow 506, that are stored in each window object 500 via arrow 505.

Since many atlas objects may be created in order to display many atlas maps on the display screen, the window object 500 communicates with the window manager 510 by means of a sequence of drawing commands issued from the window object 500 to the window manager 510, as illustrated by arrow 504. The application 508 also communicates with the window manager 510 by sending commands to the manager 510, as indicated by arrow 516. The window manager 510 maintains a window list 512 that contains each window currently in the system.

Although OOP offers significant improvements over other programming concepts, program development still requires significant outlays of time and effort, especially if no preexisting software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NeXT), Smalltalk-80 MVC (ParcPlace), Java (Sun Microsystems) and, as described further herein, Microsoft Foundation Classes (MFC).

A preferred embodiment takes the concept of frameworks and applies it throughout the entire system, including the application and the operating system. For the commercial or corporate developer, systems integrator, or OEM, this means all of the advantages that have been illustrated for a framework, such as MFC, can be leveraged not only at the system level for such services as printing, graphics, multimedia, file systems and I/O operations, but also at the application level, for things such as text, graphical user interfaces and, as described herein, network mapping tools.

Referring again to FIG. 5, the window objects 500 are elements of an improved network mapping tool having a customizable framework for greatly enhancing the ability of a user to interact with an application executing on the internetwork computing system. As described herein, the application executes in specialized viewer windows represented by the window objects. In addition, the customizable framework facilitates creation of different objects, such as the novel network atlas objects 550, stored in the memory 104. These objects generally represent a connected graph of linked nodes within the hierarchical atlas of maps displayed on screen 118 of monitor 116. It should be noted that the network atlas objects may be expanded to include certain key nodes, such as servers, in the context of the internetwork maps.

Figure 6:
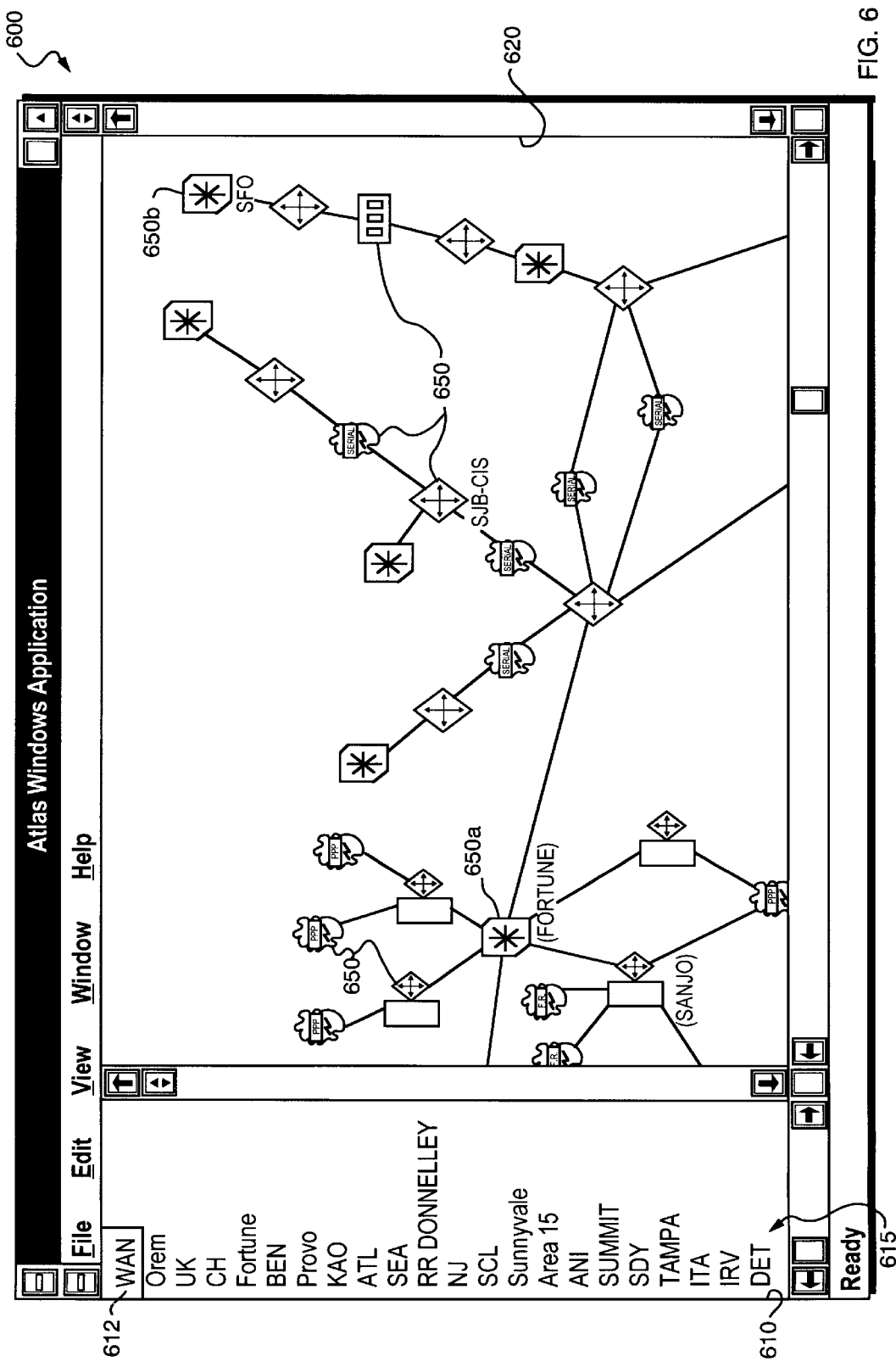
FIG. 6 is a diagram of a specialized viewer window in accordance with the invention.

FIG. 6 is a diagram of a specialized viewer window 600, which is similar to the window 124 appearing on display screen 118. The viewer window 600 is configured to simplify moving among locations of the atlas maps and, as such, provides navigation features within a plurality of panes 610 and 620. In the left pane 610, a browser 615 is provided to display a list of map names, as the right pane 620 displays a map that is selected from among those names of the browser list. Specifically, the browser navigation facility allows a user to easily switch between maps of interest by selecting the name of a desired map. The desired map may be displayed by positioning the mouse pointer and clicking on that name. The currently displayed map page is indicated by a box 612 surrounding the corresponding map name. It should be understood that other types of browsers, e.g., a tree browser depicting a directory of maps, may be used in place of the browser list. In this case, the tree browser would allow the user to go directly to a specific map from the map directory.

As noted, the atlas manager 270 (FIG. 2) of the novel mapping tool initially (e.g., as a default) constructs a set of hierarchical, internetwork maps from the topology data stored on network topology database 120 in accordance with a novel atlas creation process. Like a traditional atlas, each map depicts a portion or page of the internetwork system on the pane 620. A top-level page illustrates the overall WAN structure of the system by setting forth the interconnectivity between campuses, i.e., LAN-connected areas of the system. Individual LAN maps, each depicting the organizational structure of a campus, are presented on subordinate-level pages.

Figure 7A:
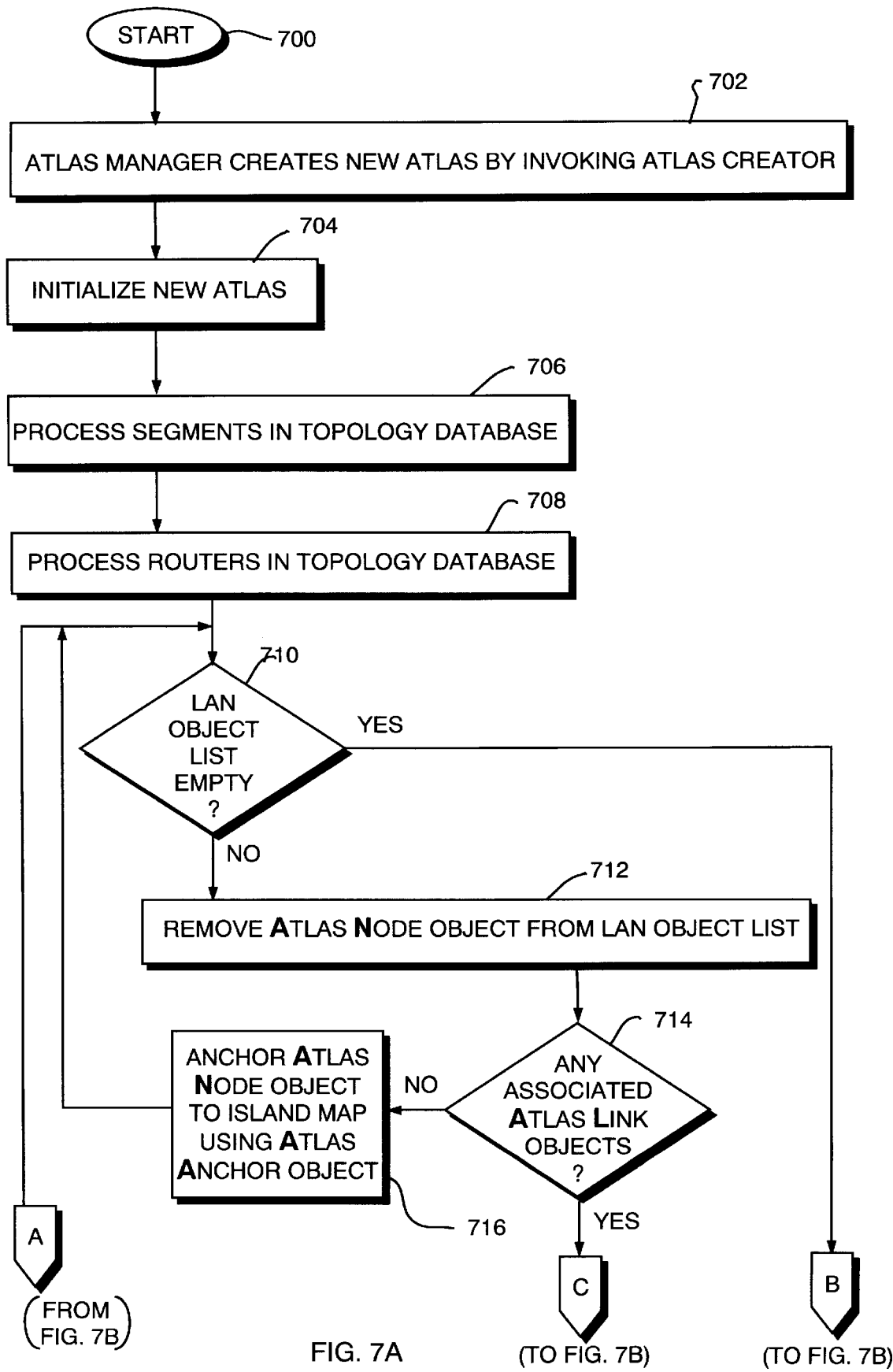
FIGS. 7A and 7B are flowcharts illustrating the sequence of steps comprising a novel atlas creation process in accordance with the invention.
Figure 7B:
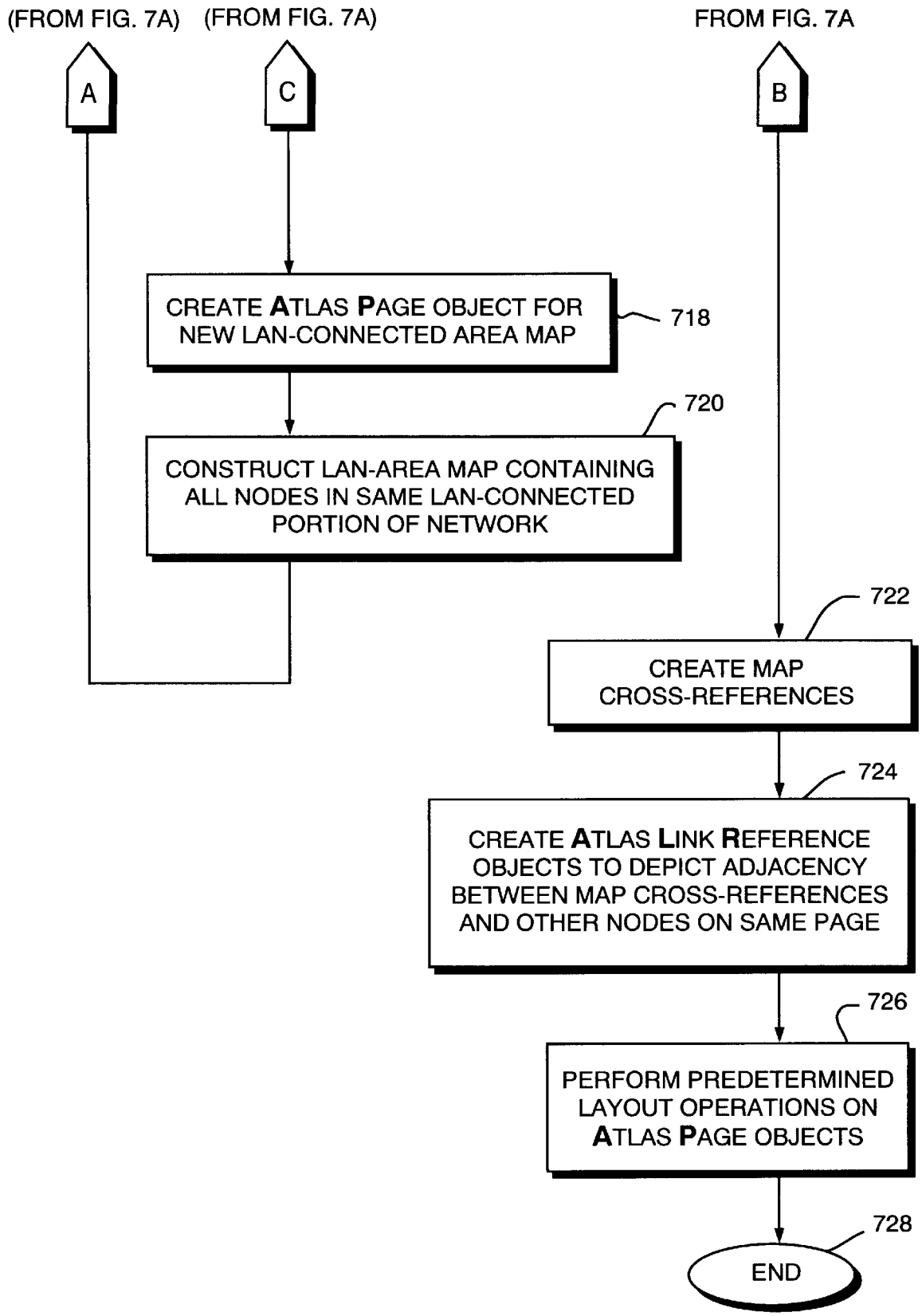

FIGS. 7A and 7B are flowcharts illustrating the sequence of steps comprising the atlas creation process. The novel process starts at Step 700 and proceeds to Step 702 where the atlas manager creates a new atlas by invoking the atlas creator from the network topology database; invocation preferably occurs in response to the user executing a File→New command from the window menu. The atlas generally comprises a 2-tier hierarchy with at least one WAN map residing at the top level of the hierarchy and a series of LAN-connected area maps arranged at a lower, subordinate level. The WAN-level map is configured to display WAN segments and routers on a created WAN page; these segments and routers interconnect various LAN-connected areas of the network. Each lower-level LAN map contains a single contiguous LAN-connected area. Cross-references for each of the LAN maps are placed on the WAN map by anchoring the LAN maps to the WAN map.

In Step 704, the atlas creator "initializes" the new atlas by creating the novel network atlas objects described herein. For example, AtlasPage objects are created for each WAN map and Island map. An Island map is a special map that serves as a convenient way to assemble segments without interfaces to routers. These segments typically surface when the network discovery program is unable to obtain information about the interfaces between segments and routers, thus leaving the topology database in an incomplete state. The atlas creator further initializes the new atlas by creating lists such as a Segment list, LAN Object list and LAN Area list.

Preferably, the segments are classified based on each segment's data-link protocol type stored in the topology database by the network discovery component 202 or the user. For example, if the data-link protocol indicates the link is a point-to-point link, rather than a multi-access link, then the segment is classified as a WAN segment. Data-link protocols such as X.25, PPP, ATM, ISDN, Frame-Relay, T1 and T3 are examples of protocols for classifying point-to-point links as WAN segments. If the data-link protocol is not known, the segment is considered a WAN segment if it interfaces to exactly two router nodes.

In Step 706, the atlas creator processes the segments in the topology database by enumerating the segments and creating an AtlasNode object for each enumerated segment. In particular, the AtlasNode objects are added to the Segment list and each associated segment is classified (marked) as a WAN or LAN segment. Those segments classified as WAN segments are then anchored to the WAN map using an AtlasAnchor object created by the atlas creator; thereafter, the AtlasNode objects associated with those segments classified as LAN segments are placed on the LAN Object list for subsequent processing.

In Step 708, all routers in the database, along with their interfaces to various segments, are enumerated. Specifically, an AtlasNode object is created for each router and an AtlasLink object is created for each interface. If a router interfaces with one or more WAN segments, the router is anchored to the WAN map using an AtlasAnchor object.

Furthermore, if the router interfaces with one or more LAN segments, its associated AtlasNode object is placed on the LAN Object List for additional processing.

In Step 710, the LAN Object list is examined to determine whether the list has any remaining objects. If the LAN Object list is not empty, then the atlas creator removes a first AtlasNode object from the list in Step 712 and examines this object for associated AtlasLink objects in Step 714. If the object has no associated AtlasLink objects, the AtlasNode object is anchored to the Island map in Step 716 using an AtlasAnchor object.

If the AtlasNode object does, in fact, have associated AtlasLink objects, the atlas creator creates an AtlasPage object for a new LAN-connected area map in Step 718 and, in Step 720, it further conducts a "breadth-first" search of linked AtlasNode objects to construct a LAN-area map containing all AtlasNode objects in the same LAN-connected portion of the network.

For this latter step, each AtlasNode object removed from the LAN Object list is examined to identify all such objects in the same LAN area. This is preferably performed by following each AtlasLink object from one AtlasNode object to an adjacent AtlasNode object, recursing through all adjacent node objects classified as LAN objects. To facilitate this search, the LAN Area list is used as a queue for traversing the connected graphs. Each adjacent AtlasNode object classified as a LAN object is removed from the LAN Object list and anchored, using an AtlasAnchor object, to the new AtlasPage object. Adjacent AtlasNode objects that are classified as WAN objects are also anchored to the new AtlasPage object using an AtlasAnchor object.

Returning to Step 710, if the LAN Object list is empty (signifying that all of LAN-connected area maps are created) the atlas creator creates map cross-references in Step 722; this is generally achieved by anchoring adjacent LAN-connect area maps to each other using AtlasAnchor objects. LAN-connected area maps are considered adjacent when a single WAN segment is anchored to two LAN-connected area maps. Here, the Segment list is enumerated and WAN segments are identified. For each identified WAN segment that is anchored to two separate LAN area maps, the AtlasNode objects representing the LAN area maps are anchored to each other using AtlasAnchor objects.

In Step 724, the atlas creator creates AtlasLinkReference objects to identify links between map cross-references and other nodes on the same page. Specifically, the AtlasLinkReference objects identify those AtlasLink objects that should be depicted on a particular map. This step is preferably performed by enumerating all AtlasLink objects and identifying the AtlasNode objects at the ends of the links. All maps that each node is anchored to are identified as dependent pages. An AtlasLinkReference object is created for each occurance of a dependent page having an anchor to the same page as a node adjacent to the node on the dependent page. The AtlasLinkReference object establishes an associating link between the dependent page and the adjacent node, and their AtlasPage objects anchored thereto.

In Step 726, the atlas layout manager enumerates all AtlasPage objects and invokes predetermined layout operations on each object. The process then ends in Step 728. The psuedo code for the novel atlas creation process is as follows:
 create Segment list
 create LAN object list
 create Campus object list
 create WAN map and Island map for each segment in the database
  {if (segment type is SERIAL,X25,PPP,ISDN,FRAME RELAY,T1,etc) or (data-link protocol is not known and segment connects to two nodes which are routers)
  anchor segment to WAN map
 else
  add segment to LAN object list}
   {for all routers in the database
   {clear LAN object flag for each interface
   {if interface is to a WAN segment mark as WAN router
 else
  set LAN object flag}
 }if WAN router
  anchor to WAN map
 if router is a LAN object
  add router to LAN object list}
while LAN object list is not empty
 {node1=remove first node from LAN object list if node1 does not interface to any other object anchor to Island page
else
 {create a new Campus (LAN connected area) map anchor Campus map to WAN map anchor node1 to Campus map
 //Do breadth 1st search to generate connected graph for Campus
 add node1 to Campus object list while Campus object list is not empty
  {node1=remove first node from Campus object list for each neighbor of node1
  {if neighbor is a segment and is a WAN object anchor object to Campus map
 else if neighbor is on the LAN object list
  {remove neighbor from LAN object list append neighbor to Campus object list anchor neighbor to Campus map}
  }
 }
}
}
//Put map cross-references on adjacent maps for all segment nodes
 {if segment node is a WAN segment
  for all neighbor nodes
   if neighbor node is not on this map
    if neighbor node's map is not anchored to this map
    {anchor neighbor node's map to this map
    anchor this map to neighbor node's map}
}
generate Link Reference objects for all cross-referenced pages for all maps (Atlas Page objects) call page.Layout()

A user may further customize an atlas, i.e., modify it from the default arrangement generated by the atlas creator program, using a variety of filing and editing operations. These operations include:
 File→New: Create a new atlas from the topology database.
 File→Save: Save a modified atlas to the atlas database.
 File→Save As: Save an atlas with a new name in the atlas database, without affecting other atlases.
 Edit→Remove: Remove selected node or cross-reference icon(s) from a map by deleting the associated anchor (s). Note, a node cannot be removed if it is only anchored to a single map.

Edit→Rename: Rename the selected node or, in the absence of a selected node, rename the current map.

Edit→New Map: Create a new map subordinate to the current map. If one or more node or map cross-reference icons are selected when this command is executed, the selected objects are moved to the new map and a cross-reference to the new map is anchored to the original map.

Edit→Delete Map: Delete a map, provided it is empty.

Edit→Layout Map: Layout the currently displayed map. If an object is selected, it is used as the root for layout operations; otherwise, the layout manager selects the root.

Edit→Resize Map: Shift all objects on the map so that the map appears in the upper left corner of the window with a small border between the objects and the edge of the map page.

Selection Operations: (Viewer highlights selected objects so they can be distinguished from non-selected objects.)

Select single object: Single click on an icon.

Select group of objects: Depress mouse button in white space on map, move mouse until displayed rectangle (rubber band) includes one or more icons and release button.

Add to selection: Perform one of previous two select operations while depressing the Ctrl key on the keyboard.

Drag and Drop operations: Hold mouse button down on selected object, move mouse to new location and release button.

Reorganize a map: Drag object(s) and drop on new location on the same map. Links between objects update automatically.

Move objects to another map: Drag selected object(s) from currently displayed map to a map name in the browser and drop. Removes objects from originating map and adds them to destination map.

Copy objects to another map: Above operation while holding the Ctrl key down. Doesn't affect originating map, adds objects to destination map.

Drag page reference on to map: Select a map name from the browser and drop on the current map; map cross-reference is placed at the drop point.

Rearrange map hierarchy: Drag a map name over another map name and drop; the dragged map becomes a child of the underlying map, bringing all of its subordinate maps with it. Drag to the root of the browser tree to move map to the top level of the browser tree. All children under a particular parent map (or root) are sorted alphabetically by name.

As a result of the above operations, the user may organize an atlas to any preferred arrangement of maps and objects. This new arrangement can be saved in the atlas database for future use.

Referring again to FIG. 6, the nodes of the graphs are preferably router and segment objects that "interface" via connected graph links. Each map may refer to other maps of the atlas by way of map cross-reference objects, although a map may not cross-reference itself. The router, segment and cross-reference objects are displayed as icons 650 at various locations on a map; for example, the map name Fortune listed on the browser 615 is depicted as an icon 650a on the WAN map of pane 620. The atlas manager 270 and atlas viewer 360 manage the links by automatically drawing lines connecting icons on the map.

There may be a situation where two objects are connected, yet only one is shown on the currently-displayed map while the other is present on a cross-referenced map. Here, the icon on the currently-displayed map is connected by a line to the cross-referenced icon of the appropriate map.

Features of the novel mapping tool include double-clicking of the mouse 112 when its pointer is focused on a map cross-reference icon to switch the display to the selected map. In other words, double-clicking the mouse 112 when the pointer is focused on the Fortune map icon 650a switches the top-level WAN map displayed on pane 620 to the corresponding subordinate-level Fortune map. In cases where there is context to maintain, the selected map is displayed without losing that context because the originating map's cross-reference is selected and scrolled to the center of the viewer window 600. Hence, a user can move between maps quickly and easily.

The structure of the novel atlas facilitates security and natural partitioning of the internetwork topology data among various databases coupled to a plurality of distributed server nodes 200. That is, the browser 615 and the atlas viewer window 600 provide an integrated directory of all atlas maps regardless of where they may reside in the network. A remote connection is needed only when viewing a map from a remote site. Use of the tree browser with dynamically expandable branches requires only a reference to the root map of the remote site in order to create an integrated directory of maps. When the user expands the branch of a remote site, a connection is opened to retrieve the directory of maps for that site.

The organization of the atlas further allows transparent navigation between such distributed databases, each of which may contain maps for their local domain. For example, referring to the map displayed on the pane 620, the subordinate map represented by Fortune icon 650a may be stored in a database that is separate and remote from the database storing the SFO map 650b. Each map, together with the browser facility 615, contain all the information needed to locate the data for the cross-referenced maps. Moreover, the hierarchy of map pages may be configured to apply security access controls so that users may be granted rights to view only certain pages of the atlas or certain entries/branches of the browser.

Other navigation features involve the use of pop-up windows and dialog boxes (not shown) on the viewer window 600. In one embodiment, a user positions the mouse pointer over a particular node icon and, in response to clicking the mouse, a small pop-up window appears listing those maps upon which the object represented by the icon appears. In another embodiment, the pop-window appears in response to the mouse cursor being overlayed upon an icon for a predetermined period of time, e.g., 1 second. Additionally, a find function allows the user to specify a particular node using a dialog box that searches the topology database; again, a list is generated indicating all maps upon which the node appears. As previously described, the user may then select a map from the list for display on the window 600 by double-clicking on an entry in the list or by selecting the map name from the generated list.

Objects of the tool may be moved or copied to any map of the atlas by manipulating the icons 650. For example, when moving objects to another map, the user may "drag and drop" the icon to a destination map's entry in the browser 615. Pressing the control (Ctrl) key of keyboard 114 while dropping the icon results in a copy operation. Cross-referencing of maps is effected by dragging a map name from the browser to an appropriate position on the map displayed on pane 620.

Route tracing is a navigation feature that highlights specific links along a route. Here, the atlas manager 270 and viewer 360 cooperate to draw a broad yellow line along those links. This feature allows the user to view the route in the context of maps with which the user is familiar; the previously mentioned navigation features can then be employed to quickly and efficiently follow that route through the atlas.

As an extension to the route tracing feature, the novel mapping tool may be configured to highlight areas of the internetwork where specific protocols are routed. Advantages of this protocol-specific topology tracing feature include viewing of individual protocol routing in the context of the entire internetwork and maintenance of a single, integrated set of maps that are familiar to the user.

Figure 8:
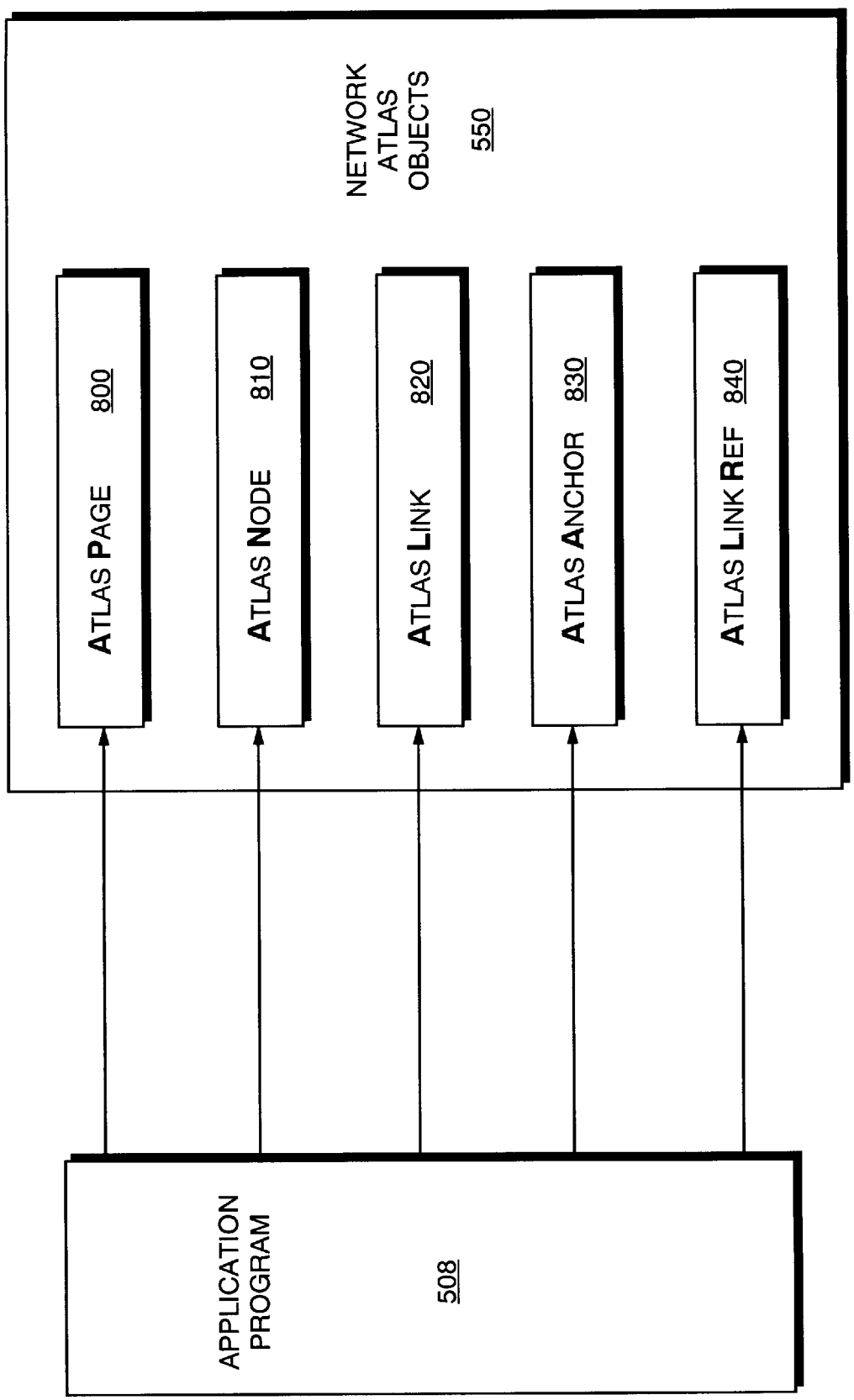
FIG. 8 is a schematic diagram of the network atlas objects used by the application program in accordance with the invention.

FIG. 8 is a schematic diagram of the network atlas objects (shown at 550 in FIG. 5) used by application program 508 to represent key elements of the topology data of the atlas. In accordance with the invention, these objects include an AtlasPage object 800, an AtlasNode object 810 and an AtlasLink object 820. The AtlasPage object 800 represents a single map in the atlas, e.g., the map displayed on the right pane 620 of viewer window 600. The AtlasNode object 810 corresponds to a node in a connected-graph, i.e., an object that is connected to other objects. As described further herein, the AtlasPage object 800 is preferably derived from the AtlasNode object 810 to enable, in the case of a cross-referenced page, that page to appear as a cross-referenced node on another page. In other words, the AtlasPage object is a "sub-class" of the AtlasNode object which allows the AtlasPage object to be anchored to another AtlasPage object and appear as a node on a page. The AtlasLink object 820 corresponds to a connected graph link that forms an association between two nodes.

Moreover, two additional objects are provided to define those nodes and links that are represented on various maps. An AtlasAnchor object 830 associates an AtlasNode object 810 with the AtlasPage object 800 upon which the AtlasNode is displayed. An attribute of this anchor association defines the position on the page where the node appears. An AtlasLinkRef object 840 associates at least one AtlasLink object 820 with an AtlasPage object 800; this indicates that those constructed links appear on the constructed page.

In order to further understand the operations of the network atlas (and window) objects, it may be useful to examine their construction together with the major function routines that comprise the behavior of the objects. In examining the objects, it is also useful to examine the classes that are used to construct the objects (as previously mentioned the classes serve as templates for the construction of objects). Thus, the relation of the classes and the functions inherent in each class can be used to predict the behavior of an object once it is constructed.

Figure 9:
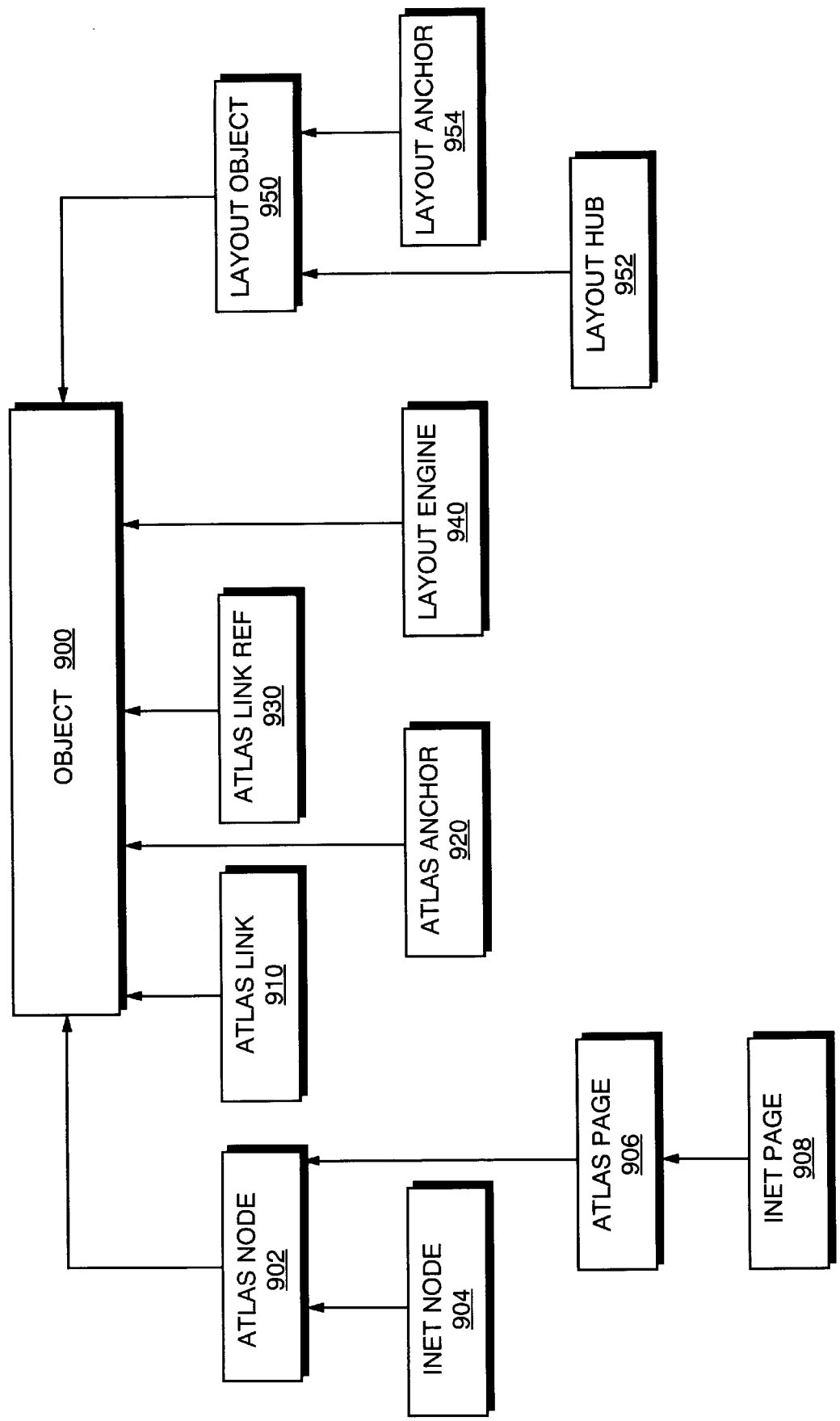
FIG. 9 is a simplified class hierarchy diagram for the network atlas objects of FIG. 8.

The invention as described herein supports Windows® API messaging and, in particular, those messaging functions supported by various conventional generic base object classes of the MFC C++ class library. FIG. 9 shows a simplified class hierarchy diagram of one of these generic base classes, the Object class 900, used to define atlas objects used in the invention. In fact, each of the classes used to construct the atlas objects are subclasses of Object and thus inherit any functional operators that are available from that base class. Indeed, the class Object 900 is a generic base class for all the MFC object classes shown in FIG. 9 and provides all message-handling functions that these object classes need.

For example, the class AtlasNode 902 is a subclass of the base class Object and is used to construct a node in a connected graph. The classes InetNode 904 and AtlasPage 906 are, in turn, derived from AtlasNode 902; InetNode 904 is used to encapsulate a router or segment node in the internetwork connected graph, while AtlasPage 906 is used construct a page (map) in the atlas. This latter class is subclassed from a node because a map may appear on another map as an abstraction of a portion of the connected graph. The class InetPage 908 defines an internetwork specific page object.

The classes AtlasLink 910, AtlasAnchor 920, AtlasLinkRef 930 and LayoutEngine 940 are subclasses of Object 900. Specifically, AtlasLink 910 is used to construct a connected graph link object between two node objects defined by AtlasNode 902, and AtlasAnchor 920 is used to construct an object that denotes the presence and position of a node on a particular page (map) in the atlas. AtlasLinkRef 930 creates an object denoting the appearance of a particular link on a particular page of the atlas; such an object is generated when the atlas is created or edited for computation and communication efficiency for rendering a page in real-time. The class LayoutEngine 940 is used to construct a controller object for layout operations.

LayoutObject class 950 is another subclass of base class Object 900 and it is primarily used to create an object that abstracts at least one other object; in other words, LayoutObject creates a transient object used temporarily during a layout process. The classes LayoutHub 952 and LayoutAnchor 954 are further derived from LayoutObject 950. LayoutHub 952 is an abstraction of a collection of layout objects that form a particular layout organization, e.g., a "hub" (parent) and "spoke" (child) organization, while LayoutAnchor 954 is used to construct a layout object that refers to a connected graph node's anchor.

Figure 10:
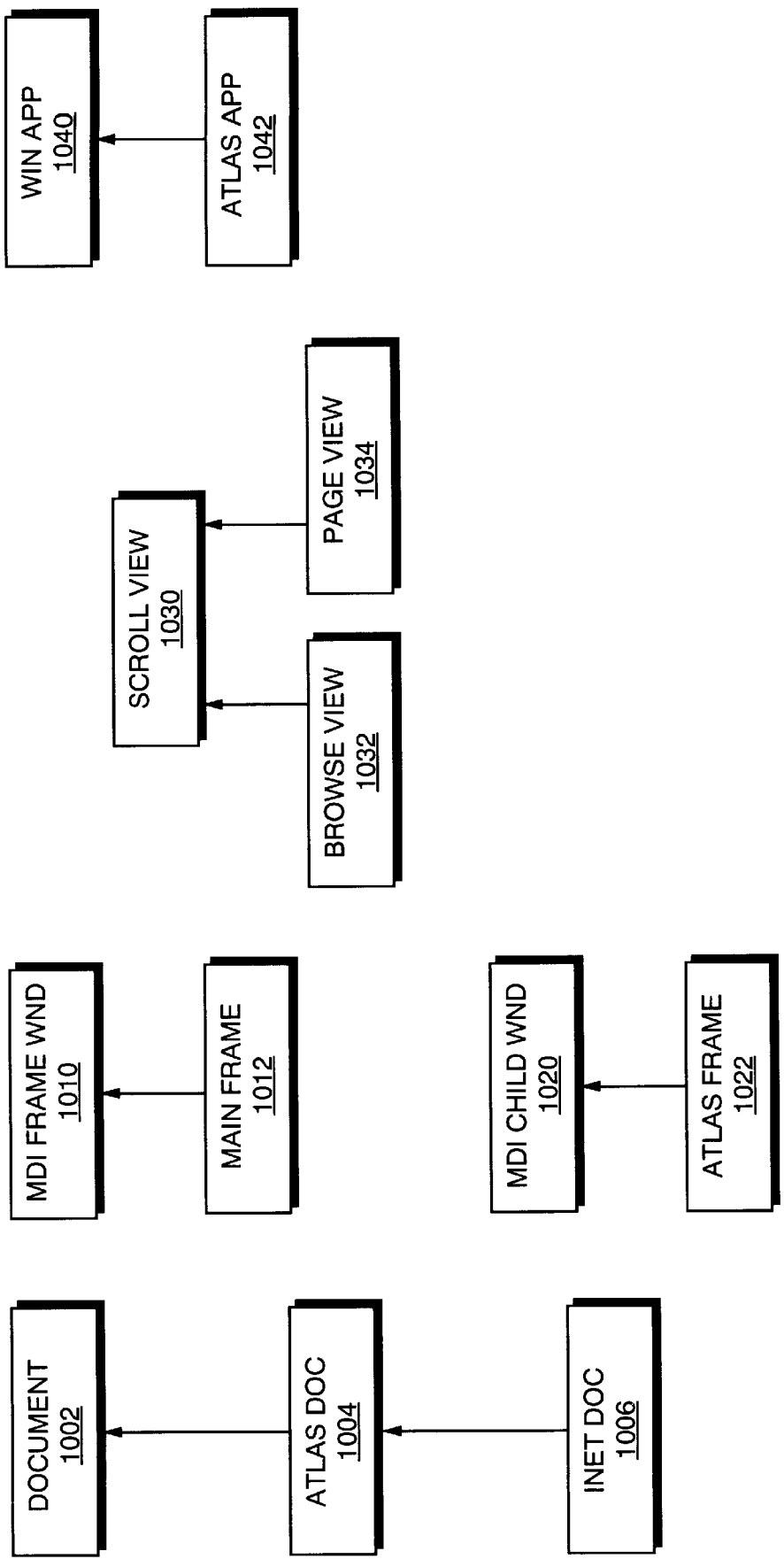
FIG. 10 shows simplified class hierarchy diagrams for various application, document and window objects of the invention.

FIG. 10 depicts simplified class hierarchy diagrams for various application, document and window objects of the invention. For example, the class AtlasDoc 1004, used to construct an Atlas document object, is a subclass of the MFC document management class Document 1002, while the class InetDoc 1006, which is a subclass of AtlasDoc 1004, is used to construct an Atlas document object that is specific to internetworking applications. The class MainFrame 1012 is a subclass of the MFC frame window class MDI-FrameWnd 1010; this former class is used to create a main Atlas viewer window object. Similarly, the class AtlasFrame 1022, used to construct pane objects for the Atlas viewer windows, is a subclass of the MFC MDI child window class MDIChildWnd 1020.

ScrollView 1030 is a MFC scrollable viewer window class from which two subclasses are derived: BrowseView 1032, used to encapsulate a browser window pane object (e.g., see FIG. 6 at 615), and PageView 1034, used to create page (map) window pane objects (e.g., see FIG. 6 at 620). Lastly, the class AtlasApp 1042 is a subclass of the MFC application class WinApp 1040 that is used to create an Atlas application object.

While there has been shown and described an illustrative embodiment for implementing the novel network mapping tool, it is to be understood that various other adaptations and modifications may be made within the spirit and scope of the invention. For example, additional system software routines may be used when implementing the invention in various applications. These additional system routines include dynamic link libraries (DLL), which are program files containing collections of window environment functions designed to perform specific classes of operations. These functions are invoked as needed by the application program to perform the desired operations. Specifically, DLLs, which are generally well-known, may be used to interact with the application program and window manager to provide the viewer windows.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A network mapping tool comprising:

a management server for organizing topology data of an internetwork computing system as an atlas of maps on a network topology database; and an atlas viewer interacting with the management server to display selected maps of the atlas on a specialized viewer window of a computer screen in a variety of views that facilitate comprehension of logical relationships between various components of the system, the viewer window comprising a browser for displaying a list of map names and a display pane for graphically displaying the contents of a selected map on the screen;

wherein said atlas viewer also interacts with said management server so as to permit user editing of said selected map in said display pane by user manipulation of the graphically-displayed contents using a pointing device, and so as to permit visual highlighting of at least certain of the graphically-displayed contents of said selected map to indicate areas where specific protocols are routed.

2. The network mapping tool of claim 1 wherein the management server comprises an atlas manager for coordinating access to the topology database for editing and viewing the atlas maps.

3. The network mapping tool of claim 2 wherein the atlas manager comprises an atlas creator for creating the atlas from the topology data and a layout manager for executing layout operations that enable display of the created atlas maps in a manner that is visually appealing to a user.

4. The network mapping tool of claim 3 wherein the browser allows the user to easily switch between maps displayed on the display pane by positioning a pointer on the corresponding map name and clicking a mouse button.

5. The network mapping tool of claim 4 wherein the contents of a selected map comprises cross-reference icons and wherein the browser further allows the user to easily switch between maps displayed on the display pane by positioning the pointer on a selected cross-reference icon and double-clicking the mouse button to display a map corresponding to the cross-reference icon without losing context of the corresponding map.

6. The network mapping tool of claim 5 wherein a selected map comprises a connected graph of linked router and segment nodes, the nodes being represented by network atlas objects.

7. The network mapping tool of claim 6 wherein the objects are further displayed as icons at various locations on the selected map and links coupling the icons are displayed as lines.

8. The network mapping tool of claim 1 wherein each map of the atlas depicts a page of the internetwork computing system, and wherein at least one top-level page illustrates a WAN structure of the system with at least one subordinate-level page illustrating structures of LAN-connected areas of the system.

9. The network mapping tool of claim 1 wherein said highlighting comprises displaying a colored line along the at least certain contents.

10. A method for constructing an atlas of maps using a network mapping tool having a topology database, the network mapping tool including a management server computer coupled to an internetwork computing system, the method comprising the steps of:

A. invoking an atlas creator component of the management server;

B. enumerating segments and routers stored in the topology database using the atlas creator;

C. classifying each enumerated segment as one of a WAN and LAN segment;

D. creating at least one WAN page and LAN-connected area page in response to Step C;

E. anchoring a router to the WAN page if the router interfaces with at least one WAN segment;

F. anchoring adjacent LAN-connected area pages to each other to generate cross-reference pages;

whereby, an atlas is constructed having at least one top-level page graphically displaying a WAN structure of the computing system and at least one subordinate-level page graphically displaying structures of LAN-connected areas of the system;

G. editing at least one of said area pages based upon user manipulation of at least one graphically-displayed component of said structures, using a pointing device; and H. visually highlighting at least certain graphically-displayed components of said structures to indicate areas in said computing system where specific protocols are routed.

11. The method of claim 10 wherein said highlighting comprises displaying playing a colored line along the at least certain components.

* * * * *